United States Patent [19]

Aoki

[11] Patent Number: 4,666,965
[45] Date of Patent: May 19, 1987

[54] FLAME-RETARDANT POLYETHYLENE TEREPHTHALATE RESIN COMPOSITION

[75] Inventor: Yoshihisa Aoki, Yokohama, Japan

[73] Assignee: Mitsubishi Rayon Co., Ltd., Tokyo, Japan

[21] Appl. No.: 815,027

[22] Filed: Dec. 30, 1985

[30] Foreign Application Priority Data

Jan. 29, 1985 [JP] Japan .................................. 60-14725
Feb. 13, 1985 [JP] Japan .................................. 60-26098
Feb. 15, 1985 [JP] Japan .................................. 60-27783

[51] Int. Cl.$^4$ ........................... C08K 5/10; C08K 5/15
[52] U.S. Cl. .................................... 524/114; 524/292; 524/605; 524/412
[58] Field of Search ................. 524/114, 292, 605; 560/112

[56] References Cited

U.S. PATENT DOCUMENTS

| | | | |
|---|---|---|---|
| 2,956,978 | 10/1960 | Reeves et al. | 560/112 |
| 3,657,191 | 4/1972 | Titzmann et al. | 525/437 |
| 3,715,388 | 2/1973 | Valbert | 560/112 |
| 3,817,901 | 6/1974 | Schaafsma | 524/292 |
| 4,215,032 | 7/1980 | Kobayashi et al. | 524/605 |
| 4,338,243 | 7/1982 | Hecht et al. | 524/292 |
| 4,351,757 | 9/1982 | Hoeschele | 524/292 |
| 4,440,889 | 4/1984 | Hergenrother et al. | 524/292 |
| 4,548,978 | 10/1985 | Garrison | 524/605 |

*Primary Examiner*—Veronica P. Hoke
*Attorney, Agent, or Firm*—Oblon, Fisher, Spivak, McClelland, & Maier

[57] ABSTRACT

Disclosed is a flame-retardant glass-fiber-reinforced polyethylene terephthalate resin composition formed by blending (A) a polyethylene terephthalate resin, (B) glass fibers, (C) a nucleating agent, (D) a monoepoxy compound having a specific chemical structure and/or a benzoic acid ester having a specific chemical structure, (E) a bromine-containing polymeric flame retarder having aromatic rings in the polymeric side chains, and (E) an antimony oxide in specified proportions.

This resin composition has a very high degree of crystallizability and can yield molded articles having excellent appearance, mechanical strength, heat distortion resistance and flame retardancy.

12 Claims, No Drawings

FLAME-RETARDANT POLYETHYLENE TEREPHTHALATE RESIN COMPOSITION

BACKGROUND OF THE INVENTION

1. Field of the Invention

This invention relates to flame-retardant polyethylene terephthalate resin compositions and, more particularly, to a flame-retardant glass-fiber-reinforced polyethylene terephthalate resin composition having a high degree of crystallizability.

2. Description of the Prior Art

Polyethylene terephthalate resins reinforced with glass fibers are known to have excellent mechanical properties and chemical resistance.

Accordingly, they are being used in the manufacture of heating appliance parts as well as electric and electronic parts. Among others, glass-fiber-reinforced polyethylene terephthalate resins having flame retardancy are especially suitable for use in electric and electronic parts.

However, conventional glass-fiber-reinforced polyethylene terephthalate resins have been disadvantageous in that, because of their low crystallization velocity, molded articles which have been crystallized to the fullest extent cannot be obtained unless high-temperature molds are used. Since the use of low-temperature molds does not permit an adequate degree of crystallization, the resultant resin moldings exhibit poor moldability and undergo marked shrinkage or warpage during after-heating.

In fields involving the use of small-sized, thin-walled articles such as electric and electronic parts, high-cycle molding with low-temperature molds is required to shorten the molding cycle, and dimensional stability is strongly desired for the resultant molded articles. In these fields, therefore, glass-fiber-reinforced polyethylene terephthalate resins having poorer high-cycle moldability and dimensional stability are being used in much smaller amounts, as compared with polybutylene phthalate resins that are analogous polyester resins. Thus, it would be desirable to improve the crystallizability of glass-fiber-reinforced polyethylene terephthalate resins.

In order to overcome the above-described disadvantages, the present inventor has made an intensive study and has found that a glass-fiber-reinforced polyethylene terephthalate resin having incorporated therein specified amounts of a polymeric flame retarder having a specific chemical structure and a certain compound effective in the promotion of crystallization can achieve an adequate degree of crystallization even at a mold temperature of 100° C. or less and, therefore, can exhibit excellent moldability.

SUMMARY OF THE INVENTION

It is an object of the present invention to provide a flame-retardant glass-fiber-reinforced polyethylene terephthalate resin which has a high degree of crystallizability and can yield molded articles retaining high mechanical strength, having a high heat distortion temperature, and exhibiting excellent moldability, releasability and dimensional stability.

According to the present invention, there is provided a flame-retardant polyethylene terephthalate resin composition comprising (A) 30 to 85% by weight of a polyethylene terephthalate resin,
(B) 5 to 60% by weight of glass fibers,
(C) 0.03 to 20% by weight of a nucleating agent,
(D) 0.1 to 10% by weight of at least one compound selected from the group consisting of compounds of the general formulae

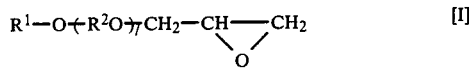

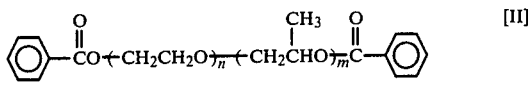

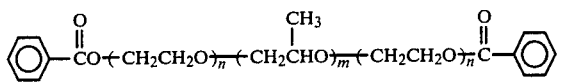

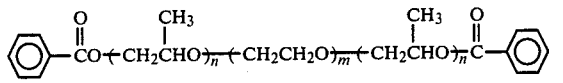

and

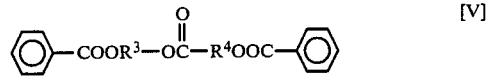

where $R^1$ is a hydrocarbon radical having 6 or more carbon atoms, $R^2$ is a hydrocarbon radical having 2 to 6 carbon atoms, $R^3$ is a hydrocarbon radical having 2 or more carbon atoms, $R^4$ is a hydrocarbon radical having 1 or more caarbon atoms, $l$ is 0 or a whole number of 1 or greater, and $n$ and $m$ are whole numbers of 1 or greater, (E) 2 to 20% by weight of a bromine-containing polymeric flame retarder having brominated aromatic rings in the polymeric side chains, and
(F) 0.5 to 10% by weight of an antimony oxide, the combined amount of components (A) to (F) being 100% by weight.

DETAILED DESCRIPTION OF THE PREFERRED EMBODIMENTS

The polyethylene terephthalate resin (A) used in the present invention is a polymer selected from the group consisting of linear homopolymers composed of ethylene terephthalate structural units; copolymers composed of a major amount of the aforesaid structural units and a minor amount of other copolymerizable monomer units; and resin mixtures of the foregoing homopolymers and copolymers. As the monomers which are copolymerizable with ethylene terephthalate units, there may be used any of various well-known acids and glycols. Specific examples thereof include dicarboxylic acids such as phthalic acid, isophthalic acid, adipic acid, sebacic acid, naphthalene-1,4- or 2,6-dicarboxylic acid and diphenylether-4,4'-dicarboxylic acid; glycols such as propylene glycol, butylene glycol, neopentyl glycol, cyclohexanedimethanol and 2,2-bis(4-hydroxyphenyl)propane; and hydroxy acids such as p-hydroxybenzoic acid and p-hydroxyethoxybenzoic acid. The aforesaid resins can be obtained by any of conventional polymerization techniques including, for example, the polycondensation of terephthalic acid and ethylene glycol by an ester exchange reaction or direct esterification reaction. Preferably, these resins should be prepared in such a way that their intrinsic viscosities [η] are in the range of 0.4 to 1.4. To this end, resins having high intrinsic viscosities can also be obtained by providing a resin having a relatively low intrinsic viscosity and polymerizing it further according to any conventional solid-phase polymerization technique. The term "intrinsic viscosity" as used herein refers to a value calculated from the solution viscosity of a resin as measured at 25° C. in a 50/50 (by weight) solvent mixture of phenol and tetrachloroethane. The above-defined polyethylene terephthalate resin is used in an amount of 30 to 85% by weight based on the total weight of the resin composition. If the amount is less than 30% by weight, a decrease in flow workability will result, while if it is greater than 85% by weight, a decrease in moldability with low-temperature molds will result.

The glass fibers (B) used in the present invention can be of any desired type such as the roving type or the chopped strand type. However, it is preferable from the viewpoint of productivity to use glass fibers of the chopped strand type. In consideration of workability for blending operation, wear of the molding machine, and breakage during the molding process, glass fibers having lengths of about 0.4 to 6 mm should preferably be used prior to blending so that the glass fibers present in the finally obtained molded articles will have lengths of about 0.2 to 2 mm. In the present resin composition, commercially available glass fibers having undergone various treatments may be used as is and no particular limitation is placed on the manner in which they are incorporated. The glass fibers are used in an amount of 5 to 60% by weight based on the total weight of the resin composition. If the amount is greater than 60% by weight, a decrease in flow workability will result, while if it is less than 5% by weight, the reinforcing effect of the glass fibers will be inadequate.

The nucleating agent (C) used in the present invention is a compound having the effect of forming nuclei in polyethylene terephthalate. Useful nucleating agents include, for example, group Ia or IIa metal salts of organic carboxylic acids such as sodium stearate, calcium stearate, sodium benzoate, calcium benzoate, sodium terephthalate and lithium terephthalate; monovalent or divalent metal salts of ionic copolymers composed of an α-olefin and an α,β-unsaturated carboxylic acid salt; oxides, sulfates and silicates of group II metals including neutral clay components such as talc, zinc oxide, magnesium oxide, calcium silicate, magnesium silicate, calcium sulfate and barium sulfate; and similar agents.

These nucleating agents may be used alone or in admixture, and are added in an amount of 0.03 to 20% by weight based on the total weight of the resin composition. Specifically, even where a metal salt of an organic carboxylic acid having a relatively powerful nucleating effect is used, good thermal resistance or a satisfactory improvement in appearance will not be obtained if it is used in an amount of less than 0.03% by weight. On the other hand, even where talc causing a less marked reduction in strength is used, amounts of 20% by weight or less will be sufficient unless it is required to act as an inorganic filler.

Among the monoepoxy compounds of the general formula [I] which fall within the scope of the compound (D) used in the present invention, those in which $R^1$ is a hydrocarbon radical having 6 to 30 carbon atoms and l has a value of 0 to 30 are preferred. Specific examples of the compounds of the general formula [I] include 2-ethylhexyl glycidyl ether, lauryl glycidyl ether, tridecyl glycidyl ether, stearyl glycidyl ether, polyethylene glycol monophenyl monoglycidyl ether, polypropylene glycol monophenyl monoglycidyl ether, polyethylene glycol monolauryl monoglycidyl ether and polyethylene glycol monostearyl monoglycidyl ether. Among others, glycidyl ethers of alcohols having a long-chain alkyl radical and monoglycidyl ethers including a polyoxyalkylene chain are preferred because they cause a less marked reduction in the molecular weight of the polyethylene terephthalate resin.

The benzoic acid esters of the general formulae [II] to [IV], which fall within the scope of the compound (D), are compounds synthesized by blocking the terminal OH groups of a block copolymer of (poly)ethylene glycol and (poly)propylene glycol through esterification with benzoic acid. In the general formulae [II] to [IV], the value of (n+m) should preferably be 30 or less. Specific examples of these compounds include those represented by the following structural formulae:

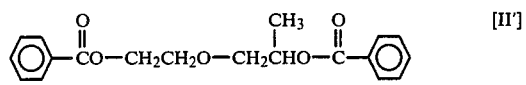

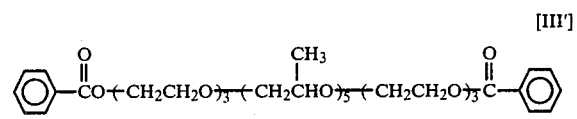

and

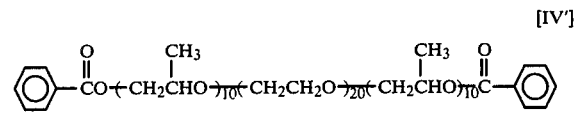

The benzoic acid esters of the general formula [V], which fall within the scope of the compound (D), are compounds synthesized by esterifying one molecule of a glycol of the formula HO—$R^3$—OH with one molecule of a hydroxy acid of the formula HOOC—$R^4$—OH to form a compound having hydroxyl groups at both ends and then blocking the terminal hydroxyl groups through esterification with benzoic acid. It is preferable that, in the general formula [V], $R^3$ be a hydrocarbon radical having 2 to 7 carbon atoms and $R^4$ be a hydrocarbon radical having 1 to 7 carbon atoms. Specific examples of the general formula [V] include those represented by the following structural formulae:

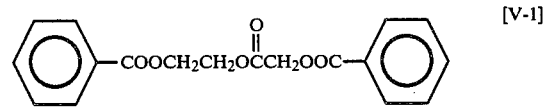

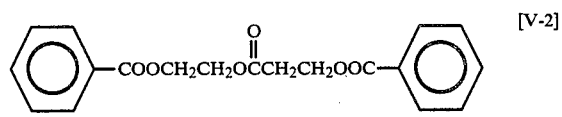

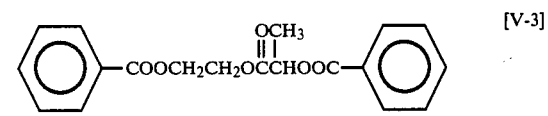

-continued

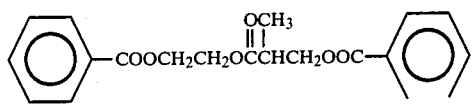
[V-4]

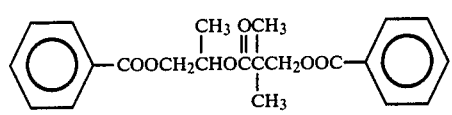
[V-5]

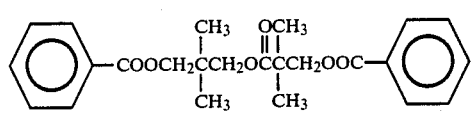
[V-6]

and

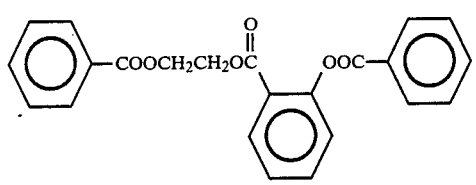
[V-7]

The compounds (D) represented by the general formulae [I] to [V] may be used alone or in admixture, and are added in an amount of 0.1 to 10% by weight based on the total weight of the resin composition. If the amount is less than 10% by weight, the crystallization-promoting effect will be inadequate, while if it is greater than 10% by weight, the resultant molded articles will show a reduction in mechanical strength.

The bromine-containing polymeric flame retarder (E) used in the present invention is a polymer having brominated aromatic rings in the polymeric side chains. Specific examples thereof include polymers of (meth)acrylic esters formed from a brominated phenol derivative and (meth)acrylic acid, such as polypentabromobenzyl acrylate, polypentabromobenzyl methacrylate, polytetrabomoxylylene bisacrylate and polytetrabromoxylylene bismethacrylate; and polymers of brominated styrenes, such as poly(2,4,6-tribromo)styrene and poly(2,4,5-tribromo)styrene. Bromine-containing polymeric flame retarders having brominated aromatic rings in the backbone are not suitable because they result in a slow crystallization velocity. Especially preferred are bromine-containing polymeric flame retarders having a bromine content of 50 to 75% by weight and a molecular weight of 1,000 or greater and preferably 2,000 or greater. As the bromine content becomes higher, smaller amounts of the flame retarder can impart flame retardancy to the resin composition without detracting from various properties thereof. Moreover, as the molecular weight becomes higher, the resultant resin composition is less likely to bleed and has better mechanical properties.

The bromine-containing polymeric flame retarder is added in an amount of 2 to 20% by weight based on the total weight of the resin composition. If the amount is less than 2% by weight, the desired flame-retarding effect is almost impossible to produce and the desired crystallization-promoting effect (arising from the combined use of the compound (D) and the flame retarder) will not be manifested distinctly. On the other hand, if the amount is greater than 20% by weight, the resultant molded articles will show a reduction in mechanical strength.

The antimony oxide (F) used in the present invention is a compound functioning as an auxiliary to the flame retarder (E), and specific examples thereof include antimony trioxide and antimony pentoxide. The amount of antimony oxide used should not be less than 0.5% by weight based on the total weight of the resin composition in order to function properly as an auxiliary flame retarder, and should not be greater than 10% by weight in order to prevent the resultant molded article from being reduced in mechanical strength.

If necessary, the polyethylene terephthalate resin composition of the present invention may further contain various additives such as fillers (e.g., wollastonite, mica, glass flakes, clay and kaolin), light or heat stabilizers, dyes, pigments and the like.

The resin composition of the present invention can be formed into molded articles in the usual manner. Specifically, the predetermined amounts of components are charged into a suitable mixing machine such as an extruder, where they are melt blended and pelletized. Then, these pellets may be formed into molded articles according to injection molding or compression molding techniques. The resin composition of the present invention is characterized in that, even if relatively thin-walled articles are molded at a mold temperature of 100° C. or below, the resulting molded articles exhibit an adequate degree of crystallinity.

In the resin composition of the present invention, it is necessary to incorporate the aforesaid components (C) to (F) simultaneously into a glass-fiber-reinforced polyethylene terephthalate resin. In particular, the combination of components (C) to (E) play an important role, and the desired effects will not be achieved even if only one of them is lacking. By using the resin composition of the present invention, flame-retardant polyethylene terephthalate resin moldings having a high degree of crystallinity can be formed even at a mold temperature of 100° C. or below without causing any reduction in mechanical strength. Thus, the resultant resin moldings exhibit excellent properties in respect of moldability, releasability and dimensional stability.

The present invention is further illustrated by the following examples. In these examples, all parts are by weight.

EXAMPLES 1-26

To a polyethylene terephthalate homopolymer having an intrinsic viscosity [$\eta$] of 0.72 were added chopped strand glass fibers (referred to as GF in Table 1) and the above-described components (C) to (F) in the respective proportions given in Table 1. These components were blended in a V-type blender for 5 minutes to form a homogeneous mixture. The resulting mixture was charged into a 65 mm$\phi$ vented melt extruder and extruded at a cylinder temperature of 260°–280° C. to obtain pellets of a resin composition in accordance with the present invention.

Using a 3-ounce, 30 mm$\phi$ screw in-line type injection molding machine, these pellets were molded at a cylinder temperature of 270° C., a mold temperature of 80° C. and a molding cycle time of 30 seconds to form strip specimens measuring 127×12.7×1.6 mm and ASTM No. 1 dumbbells. The above strip specimens of 1.6 mm thickness were used to measure the energy of crystallization, $\Delta H$, during heating in a differential calorimeter and also to carry out a flammability test according to the procedure of UL-94V. On the other hand, the ASTM No. 1 dumbbells were used to carry out tensile tests.

The measurement of $\Delta H$ with a differential calorimeter was made by cutting out the middle part of a strip specimen of 1.6 mm thickness, heating this sample in nitrogen atmosphere at a rate of 10° C./min., and then calculating $\Delta H$ from the area of the crystallization peak $Tc^+$ recorded during heating. Specifically, $\Delta H$ represents the heat energy evolved during the process in which the non-crystalline portion quenched and frozen at the time of molding is crystallized by reheating. Lower values of $\Delta H$ indicate that a higher degree of crystallization has been achieved at the time of molding and that, therefore, less shrinkage or warpage will occur during after-heating.

COMPARATIVE EXAMPLES 1-10

Resin compositions were prepared in the same manner as described in the foregoing examples, except that the compounds given in Table 1 were used as additives. Then, the same tests were made on these resin compositions. The results thus obtained are also given in Table 1.

TABLE 1

| | | | | | Composition | | | | | | | | UL-94V flammability [1/16 inch] (rank) | Mechanical strength Tensile characteristics | | |
|---|---|---|---|---|---|---|---|---|---|---|---|---|---|---|---|---|
| | PET (parts) | GF (parts) | Component C | | Component (D) | | Component (E) | | Component (F) | | DSC ΔH [1/16 inch] (cal/g) | | | Strength (kg/cm²) | Elastic modulus (× 10⁴ kg/cm²) | Elongation (%) |
| | | | Type | Amount (parts) | Type | Amount (parts) | Type | Amount (parts) | Type | Amount (parts) | | | | | | |
| Example 1 | 52.5 | 30 | Talc | 3.0 | Lauryl glycidyl ether | 3.0 | Pyrocheck 68PB (2) | 8.0 | Antimony trioxide | 3.5 | 0.5 | V-0 | | 1180 | 9.8 | 2.0 |
| Example 2 | 52.5 | 30 | Talc | 3.0 | Polyethylene glycol monolauryl monoglycidyl ether | 3.0 | Pyrocheck 68PB (2) | 8.0 | Antimony trioxide | 3.5 | 0.8 | V-0 | | 1250 | 9.5 | 2.1 |
| Example 3 | 54.0 | 30 | Talc | 3.0 | Polyethylene glycol monolauryl monoglycidyl ether | 3.0 | Polypentabromobenzyl acrylate (3) | 6.5 | Antimony trioxide | 3.5 | 1.1 | V-0 | | 1270 | 9.9 | 2.2 |
| Example 4 | 53.5 | 30 | Talc | 3.0 | Polyethylene glycol monolauryl monoglycidyl ether | 3.0 | Polypentabromobenzyl acrylate (3) | 6.5 | Antimony pentoxide | 4.0 | 0.7 | V-0 | | 1210 | 10.1 | 1.9 |
| Example 5 | 55.45 | 30 | Sodium benzoate | 0.05 | Polyethylene glycol monolauryl monoglycidyl ether | 3.0 | Pyrocheck 68PB | 8.0 | Antimony trioxide | 3.5 | 0.6 | V-0 | | 1170 | 10.2 | 1.8 |
| Example 6 | 53.5 | 30 | Haimiran 1605 (1) | 2.0 | Polyethylene glycol monolauryl monoglycidyl ether | 3.0 | Pyrocheck 68PB | 8.0 | Antimony trioxide | 3.5 | 1.3 | V-0 | | 1270 | 9.4 | 2.0 |
| Example 7 | 48.5 | 30 | Talc | 3.0 | Polyethylene glycol monolauryl monoglycidyl ether | 7.0 | Pyrocheck 68PB | 8.0 | Antimony trioxide | 3.5 | 0.3 | V-0 | | 1160 | 9.4 | 2.3 |
| Example 8 | 45.5 | 30 | Talc | 3.0 | Polyethylene glycol monolauryl monoglycidyl ether | 10.0 | Pyrocheck 68PB | 8.0 | Antimony trioxide | 3.5 | 0.5 | V-0 | | 1210 | 10.3 | 1.9 |
| Example 9 | 45.5 | 30 | Talc | 3.0 | Polyethylene glycol monolauryl monoglycidyl ether | 3.0 | Pyrocheck 68PB | 15.0 | Antimony trioxide | 3.5 | 0.4 | V-0 | | 1120 | 9.8 | 1.8 |
| Example 10 | 52.5 | 30 | Talc | 3.0 | 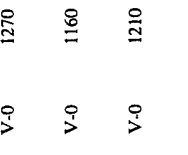 | 3.0 | Pyrocheck 68PB | 8.0 | Antimony trioxide | 3.5 | 0.3 | V-0 | | 1150 | 10.1 | 1.9 |
| Example 11 | 52.5 | 30 | Talc | 3.0 | 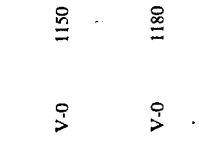 | 3.0 | Pyrocheck 68PB | 8.0 | Antimony trioxide | 3.5 | 0.5 | V-0 | | 1180 | 9.9 | 2.0 |
| Example 12 | 52.0 | 30 | Talc | 3.0 | 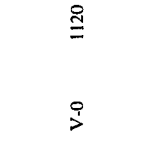 | 3.0 | Pyrocheck 68PB | 8.0 | Antimony pentoxide | 4.0 | 0.4 | V-0 | | 1120 | 9.9 | 2.0 |

TABLE 1-continued

| | | | Composition | | | | | | | | | UL-94V flammability [1/16 inch] (rank) | Mechanical strength Tensile characteristics | | |
|---|---|---|---|---|---|---|---|---|---|---|---|---|---|---|---|
| | PET (parts) | GF (parts) | Component C | | Component (D) | | Component (E) | | Component (F) | | DSC ΔH [1/16 inch] (cal/g) | | Strength (kg/cm²) | Elastic modulus (×10⁴ kg/cm²) | Elongation (%) |
| | | | Type | Amount (parts) | Type | Amount (parts) | Type | Amount (parts) | Type | Amount (parts) | | | | | |
| Example 13 | 54.0 | 30 | Talc | 3.0 | [structure] | 3.0 | Polypentabromobenzyl acrylate | 6.5 | Antimony trioxide | 3.5 | 1.0 | V-0 | 1210 | 9.8 | 2.1 |
| Example 14 | 51.0 | 30 | Talc | 3.0 | [structure] | 3.0 | Polypentabromobenzyl acrylate | 6.5 | Antimony trioxide | 3.5 | 0.7 | V-0 | 1100 | 9.8 | 2.2 |
| Example 15 | 45.5 | 30 | Talc | 10.0 | [structure] | 3.0 | Pyrocheck 68PB | 8.0 | Antimony trioxide | 3.5 | 0.3 | V-0 | 1230 | 10.3 | 1.8 |
| Example 16 | 45.5 | 30 | Talc | 3.0 | [structure] | 3.0 | Pyrocheck 68PB | 15.0 | Antimony trioxide | 3.5 | 0.5 | V-0 | 1120 | 9.9 | 1.8 |
| Example 17 | 53.5 | 30 | Haimiran 1605 | 2.0 | [structure] | 3.0 | Pyrocheck 68PB | 8.0 | Antimony trioxide | 3.5 | 0.8 | V-0 | 1210 | 9.7 | 2.0 |
| Example 18 | 54 | 30 | Talc | 3.0 | [structure] | 3.0 | Polypentabromobenzyl acrylate | 6.5 | Antimony trioxide | 3.5 | 1.2 | V-0 | 1210 | 10.1 | 1.9 |
| Example 19 | 53.5 | 30 | Talc | 3.0 | [structure] | 3.0 | Polypentabromobenzyl acrylate | 6.5 | Antimony pentoxide | 4.0 | 0.9 | V-0 | 1170 | 9.8 | 2.0 |
| Example 20 | 52.5 | 30 | Talc | 3.0 | [structure] | 3.0 | Pyrocheck 68PB | 8.0 | Antimony trioxide | 3.5 | 0.7 | V-0 | 1230 | 9.9 | 1.9 |

TABLE 1-continued

| | | | Composition | | | | | | | | | | |
|---|---|---|---|---|---|---|---|---|---|---|---|---|---|
| | PET (parts) | GF (parts) | Component C | | Component (D) | Component (E) | | Component (F) | | DSC ΔH [1/16 inch] (cal/g) | UL-94V flammability [1/16 inch] (rank) | Mechanical strength Tensile characteristics | | |
| | | | Type | Amount (parts) | Type | Type | Amount (parts) | Type | Amount (parts) | | | Strength (kg/cm²) | Elastic modulus (×10⁴ kg/cm²) | Elongation (%) |
| Example 21 | 45.5 | 30 | Talc | 10 |  | Pyrocheck 68PB | 8.0 | Antimony trioxide | 3.5 | 0.5 | V-0 | 1250 | 10.5 | 1.8 |
| Example 22 | 47.5 | 30 | Talc | 3.0 |  | Pyrocheck 68PB | 8.0 | Antimony trioxide | 3.5 | 0.3 | V-0 | 1140 | 9.7 | 2.1 |
| Example 23 | 47.5 | 30 | Talc | 3.0 | 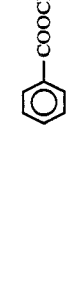 | Pyrocheck 68PB | 13.0 | Antimony trioxide | 3.5 | 0.5 | V-0 | 1160 | 9.9 | 1.8 |
| Example 24 | 55.4 | 30 | Sodium stearate | 0.1 | 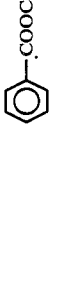 | Pyrocheck 68PB | 8.0 | Antimony trioxide | 3.5 | 0.5 | V-0 | 1120 | 10.2 | 1.8 |
| Example 25 | 52.5 | 30 | Talc | 3.0 |  | Pyrocheck 68PB | 8.0 | Antimony trioxide | 3.5 | 0.8 | V-0 | 1250 | 9.9 | 2.0 |
| Example 26 | 52.5 | 30 | Talc | 3.0 |  | Pyrocheck 68PB | 8.0 | Antimony trioxide | 3.5 | 0.7 | V-0 | 1190 | 10.1 | 1.9 |
| Comparative Example 1 | 57.0 | 30 | Talc | 3.0 | — | Polypentabromobenzyl acrylate | 6.5 | Antimony trioxide | 3.5 | 12.5 | V-0 | 1270 | 10.2 | 2.0 |
| Comparative Example 2 | 54.0 | 30 | Talc | 3.0 | Polyethylene glycol monolauryl monoglycidyl ether | PO-64P (4) | 3.0 | Antimony trioxide | 3.5 | 3.5 | V-0 | 1250 | 10.3 | 2.2 |

TABLE 1-continued

| | PET (parts) | GF (parts) | Component C Type | Component C Amount (parts) | Component (D) Type | Component (E) Type | Component (E) Amount (parts) | Component (F) Type | Component (F) Amount (parts) | DSC ΔH [1/16 inch] (cal/g) | UL-94V flammability [1/16 inch] (rank) | Mechanical strength Tensile characteristics Strength (kg/cm²) | Elastic modulus (×10⁴ kg/cm²) | Elongation (%) |
|---|---|---|---|---|---|---|---|---|---|---|---|---|---|---|
| Comparative Example 3 | 52.0 | 30 | Talc | 3.0 | Polyethylene glycol monolauryl monoglycidyl ether | Fire Guard 7000 (5) | 8.5 | Antimony trioxide | 3.5 | 4.2 | V-0 | 1310 | 9.8 | 2.1 |
| Comparative Example 4 | 55.5 | 30 | — | — | Polyethylene glycol monolauryl monoglycidyl ether | Pyrocheck 68PB | 8.0 | Antimony trioxide | 3.5 | 17.6 | V-2 | 1020 | 9.2 | 2.4 |
| Comparative Example 5 | 54.0 | 30 | Talc | 3.0 |  | PO-64P | 6.5 | Antimony trioxide | 3.5 | 3.0 | V-0 | 1280 | 10.2 | 2.3 |
| Comparative Example 6 | 52.0 | 30 | Talc | 3.0 |  | Fire Guard 7000 | 8.5 | Antimony trioxide | 3.5 | 4.1 | V-0 | 1330 | 9.9 | 2.1 |
| Comparative Example 7 | 55.5 | 30 | — | — | 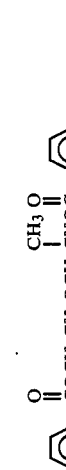 | Pyrocheck 68PB | 8.0 | Antimony trioxide | 3.5 | 18.0 | V-2 | 980 | 9.1 | 2.5 |
| Comparative Example 8 | 54 | 30 | Talc | 3.0 | 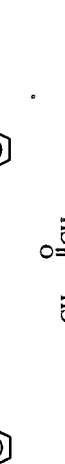 | BC-58 (6) | 7.5 | Antimony trioxide | 3.5 | 14.0 | V-0 | 1320 | 10.4 | 2.2 |
| Comparative Example 9 | 53.7 | 30 | Talc | 3.0 |  | HR-133 (7) | 7.8 | Antimony trioxide | 3.5 | 3.2 | V-0 | 1310 | 10.2 | 2.0 |
| Comparative Example 10 | 55.5 | 30 | — | — |  | Pyrocheck 68PB | 8.0 | Antimony trioxide | 3.5 | 16.5 | V-2 | 980 | 8.9 | 2.4 |

[Notes]
(1) Haimiran 1605: A sodium salt of an ethylene/methacrylic acid copolymer (trade mark, manufactured by Mitsui Polychemical Co., Ltd.).
(2) Pyrocheck 68PB: Poly(tribromostyrene) having a molecular weight of about 200,000 and a Br content of 66-68% by weight (trade mark, manufactured by Fellow Corp.).
(3) Polypentabromobenzyl acrylate having a molecular weight of about 70,000 and a Br content of about 70% by weight.
(4) PO-64P: Poly(dibromophenylene oxide) as a compound having brominated aromatic rings in the backbone (trade mark, manufactured by Great Lakes Chemicals Co.).
(5) Fire Guard 7000: A brominated polycarbonate as a compound having brominated aromatic rings in the backbone (trade mark, manufactured by Teijin Kasei K.K.).
(6) BC-58: A brominated polycarbonate as a compound having brominated aromatic rings in the backbone (trade mark, manufactured by Great Lakes Chemicals Co.).
(7) HR-133: A brominated epoxy resin as a compound having brominated aromatic rings in the backbone (trade mark, manufactured by Hitachi Kasei K.K.).

As is evident from the results shown in Table 1, the combined use of components (C) to (F) resulted in very small values of ΔH for the molded articles of 1.6 mm thickness formed at a mold temperature of 80° C., indicating that molded articles having an adequate degree of crystallinity can be obtained. By contrast, Comparative Examples 1 and 4 indicate that, if either component (C) or component (D) is lacking, the value of ΔH is increased by a factor of 3–4 and the degree of crystallinity is decreased correspondingly.

Thus, as a result of the combined use of components (C) to (F) in a glass-fiber-reinforced polyethylene terephthalate resin, the polyethylene terephthalate resin composition of the present invention has a high crystallization velocity and can yield molded articles having good moldability and mechanical strength even at a molding temperature of 100° C. or below.

What is claimed is:

1. A flame-retardant polyethylene terephthalate resin composition comprising
   (A) 30 to 85% by weight of a polyethylene terephthalate resin,
   (B) 5 to 60% by weight of glass fibers,
   (C) 0.03 to 20% by weight of a nucleating agent,
   (D) 0.1 to 10% by weight of at least one compound selected from the group consisting of compounds of the general formulae $$\text{[II]} \quad \underset{\text{O}}{\underset{\|}{\phi}}-\text{CO}(\text{CH}_2\text{CH}_2\text{O})_n(\text{CH}_2\underset{\overset{|}{\text{CH}_3}}{\text{CHO}})_m-\underset{\overset{\|}{\text{O}}}{\text{C}}-\phi$$

$$\text{[III]} \quad \phi-\underset{\overset{\|}{\text{O}}}{\text{CO}}(\text{CH}_2\text{CH}_2\text{O})_n(\text{CH}_2\underset{\overset{|}{\text{CH}_3}}{\text{CHO}})_m(\text{CH}_2\text{CH}_2\text{O})_n-\underset{\overset{\|}{\text{O}}}{\text{C}}-\phi$$

$$\text{[IV]} \quad \phi-\underset{\overset{\|}{\text{O}}}{\text{CO}}(\text{CH}_2\underset{\overset{|}{\text{CH}_3}}{\text{CHO}})_n(\text{CH}_2\text{CH}_2\text{O})_m(\text{CH}_2\underset{\overset{|}{\text{CH}_3}}{\text{CHO}})_n-\underset{\overset{\|}{\text{O}}}{\text{C}}-\phi$$

and $$\text{[V]} \quad \phi-\text{COOR}^3-\underset{\overset{\|}{\text{O}}}{\text{OC}}-\text{R}^4\text{OOC}-\phi$$

wherein R³ is a hydrocarbon radical having 2 to 7 carbon atoms, R⁴ is a hydrocarbon radical having 1 to 7 carbon atoms and n and m are whole numbers of 1 or greater,
   (E) 2 to 20% by weight of a bromine-containing polymeric flame retarder having brominated aromatic rings in the polymeric side chains, and
   (F) 0.5 to 10% by weight of an antimony oxide, the combined amount of components (A) to (F) being 100% by weight.

2. The composition of claim 1 wherein the polyethylene terephthalate resin (A) has an intrinsic viscosity of 0.4 to 1.4 as measured in a 50/50 (by weight) mixture of phenol and tetrachloroethylene.

3. The composition of claim 1 wherein the nucleating agent (C) comprises one or more compounds selected from the group consisting of group Ia or IIa metal salts of organic carboxylic acids, monovalent or divalent metal salts of ionic copolymers composed of an α-olefin and an α,β-unsaturated carboxylic acid salt, as well as oxides, sulfates and silicates of group II metals.

4. The composition of claim 1 wherein the bromine-containing polymeric flame retarder (E) comprises one or more polymers selected from the group consisting of polymers of (meth)acrylic esters formed by the esterification of a brominated phenol derivative with (meth)acrylic acid, and polymers of brominated styrenes.

5. The composition of claim 1 wherein the antimony oxide (F) comprises antimony trioxide or antimony pentoxide.

6. The composition of claim 1, wherein said polyethylene terephthalate resin component (A) is a copolymer obtained by copolymerizing ethylene terephthalate units with at least one dicarboxylic acid, glycol or hydroxy acid comonomer.

7. The composition of claim 6, wherein said dicarboxylic acid is phthalic acid, isophthalic acid, adipic acid, sebacic acid, naphthalene-1,4-or 2,6-dicarboxylic acid or diphenylether-4,4'-dicarboxylic acid; said glycol is propylene glycol, butylene glycol, neopentyl glycol, cyclohexanedimethanol or 2,2-bis(4-hydroxyphenyl) propane; and said hydroxy acid is p-hydroxybenzoic acid or p-hydroxyethoxybenzoic acid.

8. The composition of claim 1, wherein said glass fibers have lengths ranging from 0.4–6 mm.

9. The composition of claim 1, wherein said bromine-containing polymeric flame retardant (E) is a brominated phenyl (meth)acrylate selected from the group consisting of polypentabromobenzyl acrylate, polypentabromobenzyl methacrylate, polytetrabromoxylylene bisacrylate and polytetrabromoxylylene bismethacrylate.

10. The composition of claim 1, wherein said bromine-containing polymeric flame retardant (E) is a brominated styrene selected from the group consisting of poly(2,4,6-tribromo)styrene and poly(2,4,5-tribromostyrene).

11. The composition of claim 1, wherein said bromine-containing polymeric flame retardant (E) has a bromine content of 50–75% by weight and a molecular weight greater than 1000.

12. A flame-retardant polyethylene terephthalate resin composition, comprising:
   (A) 30 to 85% by weight of a polyethylene terephthalate resin,
   (B) 5 to 60% by weight of glass fibers,
   (C) 0.03 to 20% by weight of a nucleating agent,
   (D) 0.1 to 10% by weight of the compound:

$$\text{R}^1-\text{O}-(\text{R}^2\text{O})_l-\text{CH}_2-\underset{\underset{\text{O}}{\diagdown\quad\diagup}}{\text{CH}-\!\!-\!\!\text{CH}_2}$$

wherein R¹ is a hydrocarbon radical of 6 to 30 carbon atoms, R² is a hydrocarbon radical of from 2 to 6 carbon atoms and l is 0 or an integer of from 1 to 30,
   (E) 2 to 20% by weight of a bromine-containing polymeric flame retarder having brominated aromatic rings in the polymeric side chains, and
   (F) 0.5 to 10% by weight of an antimony oxide, the combined amount of components (A) to (F) being 100% by weight.

* * * * *